May 18, 1948. A. E. LANE 2,441,825
ROTARY INDICATOR EMPLOYING LIGHT-CONDUCTING ELEMENTS
Filed Oct. 31, 1944 2 Sheets-Sheet 1
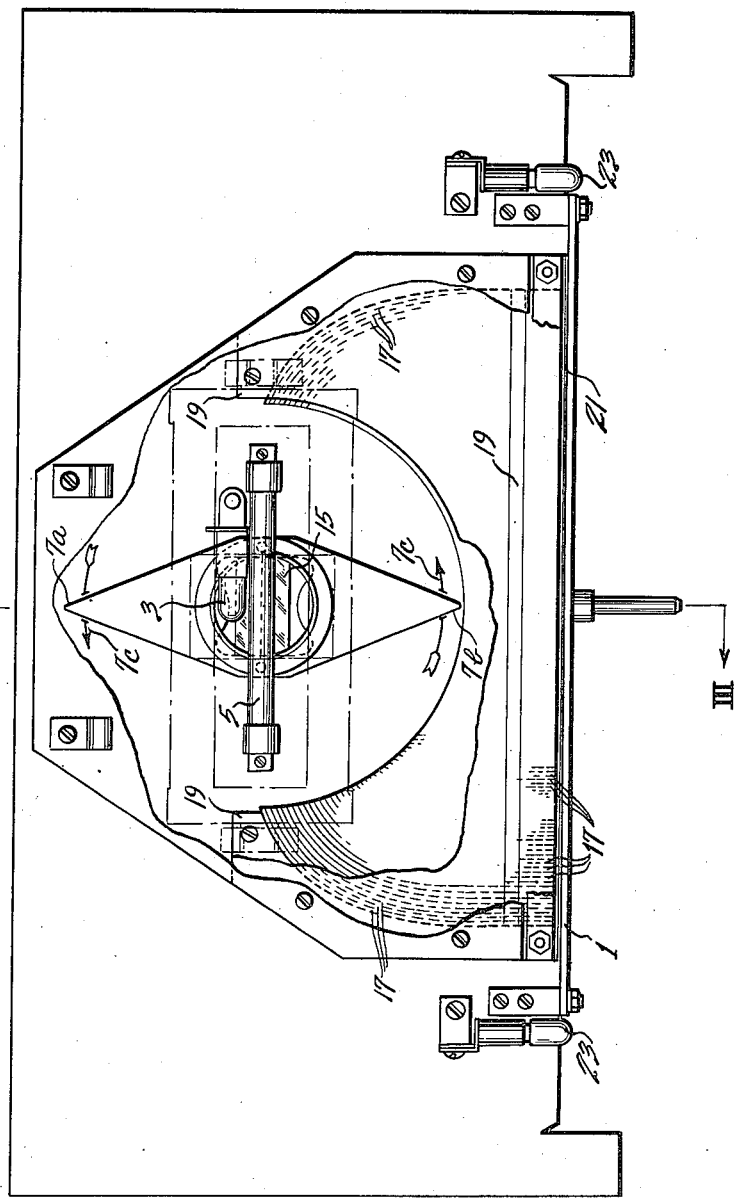
INVENTOR.
ALBERT E. LANE
BY
ATTORNEY May 18, 1948.　　　　　　　A. E. LANE　　　　　　　2,441,825
ROTARY INDICATOR EMPLOYING LIGHT-CONDUCTING ELEMENTS
Filed Oct. 31, 1944　　　2 Sheets-Sheet 2
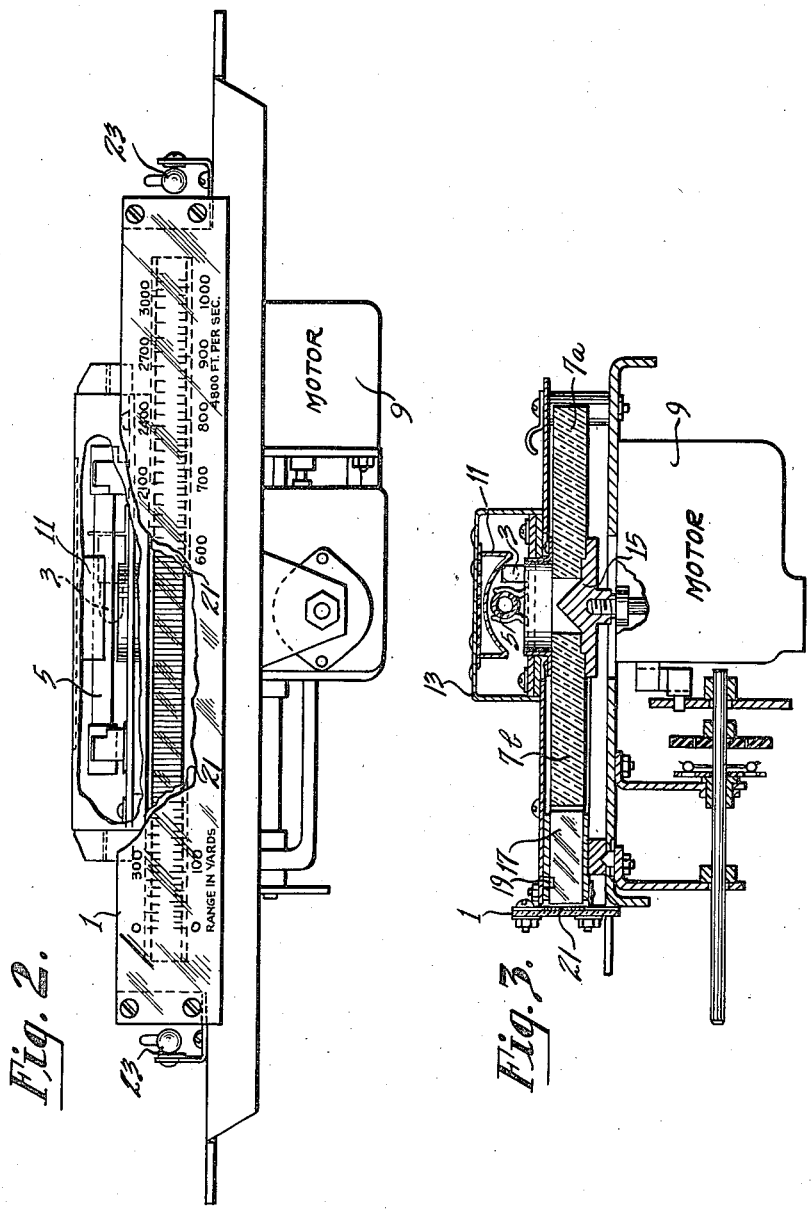
INVENTOR.
ALBERT E. LANE
BY
ATTORNEY Patented May 18, 1948

2,441,825

UNITED STATES PATENT OFFICE 2,441,825

ROTARY INDICATOR EMPLOYING LIGHT-CONDUCTING ELEMENTS

Albert E. Lane, Wenona, N. J., assignor to Radio Corporation of America, a corporation of Delaware Application October 31, 1944, Serial No. 561,308

1 Claim. (Cl. 116—129)

This invention relates to an improved method of and apparatus for transmitting light rays from a source moving in a path of a certain contour to a scale, screen or target of a different contour and, though not limited thereto, will be described as applied to an improved direct-reading indicator for submarine-signaling and analogous (i. e., "pulse") systems for the communication of intelligence.

It is well known that the presence and indeed the location of a distant object, or one immersed in an obscuring medium such as water, fog or smoke, can be detected by means of vibrations reflected from the object. Thus, in submarine signaling systems, short pulses constituted of compressional waves are directed upon the object and the pulses which are reflected from the object are picked up and converted into electrical impulses which are employed to energize a lamp, or the like, at intervals indicative of the time it has taken for the said waves or pulses to return to their source. In order to translate such periods of time into terms of actual distance between the radiator or detector and the detected object it is necessary that the source or "virtual source" of light be moved continuously in an endless path about a suitably calibrated scale. The indicators employed for this purpose may be of the "electronic type" or of the "mechanical type." The usual electronic indicator consists of a cathode-ray tube wherein the electron-beam comprises the "light source" and the fluorescent window or target, being suitably marked, comprises the dial upon which the "light" impinges.

Since cathode-ray tubes, especially those sufficiently large to provide an easily readable scale, are very expensive and are quite fragile, it is usually preferable to employ an indicator of the mechanical type. Such mechanical indicators are well exemplified in Figs. 9 and 10 of U. S. Patent 2,071,284, which show a circular or "clock face" dial wherein the scale markings are illuminated by light transmitted thereto through a rotating quartz rod.

While indicators of the mechanical type are usually more rugged than the electronic type, those entrusted with the operation of submarine-signaling systems maintain that mechanical indicators are open to an objection which, though psychological in nature, is nevertheless a very real and serious one. This objection to the mechanical indicators of the type dictated by the prior art arises from the use of a circular or clock-face scale and will be apparent when it is appreciated that in some cases the eyes of the observer are obliged to follow the cursor continuously during its more or less rapid excursions about the scale. Thus, it is said, the gyrations of the operator's eyes in following the cursor (or the "white" light) in its circular path about a clock-like dial scale may induce hypnosis or render him sufficiently "dizzy" to augment the possibility of a false reading. However this may be, those concerned with the operation of such instruments prefer a linear (or, in some cases a slightly curved scale) to a circular or 180° arcuate scale of similar or lesser length.

Accordingly, the principal object of the present invention is to provide a reliable and trouble-free method of and apparatus for transmitting rays from a source (or "virtual source") of light moving in a circular or other non-linear path to a "linear" scale-bearing surface, or other target.

It might at first glance appear that the foregoing objects might be simply achieved in the manner suggested by U. S. Reissue Patent 17,784, i. e., by causing a spot source of light to rotate in a circular (instead of a spiral) path, and by mounting a screen in a plane substantially tangent to the circle so that the spot runs across the screen in a straight line. Such an indicator, however, would be capable of producing an accurate indication only at the center of the screen where the angle of incidence is 90°. (This is so because when the light is directed toward an end of the screen it is subject to diffusion by reason of the smaller angle and greater distance the light rays must travel before reaching the screen.)

Accordingly, another and specific object of the present invention is to provide an improved indicator of the type wherein the signal is derived from a rotating spot or beam of light, and one capable of providing an accurate and well defined indication irrespective of the portion of the screen upon which the said light impinges.

Other objects and advantages will be apparent and the invention itself will be best understood upon reference to the following specification and to the accompanying drawing wherein:

Fig. 1 is a top plan view of an indicator constructed in accordance with the principle of the invention and including means for transmitting light rays from a rotating source to a linear scale, Fig. 2 is a front elevational view, partly in section, of the device of Fig. 1, and Fig. 3 is a sectional view taken on the line III—III of Fig. 1.

The embodiment of the invention which has been selected for illustration is designed for use in an underwater signaling system of the type capable of detecting the location of a remote obstacle or other object and, to this end, is provided with a scale-bearing surface 1 which is calibrated in terms of distance, e. g., meters or yards. The moving index or cursor for the scale 1 normally (i. e., in the absence of a signal indicative of an obstacle) comprises a narrow beam or spot of white light which is derived, in a manner later described, from a constantly lighted incandescent lamp or bulb 3. The white rays from the bulb 3 however are blanketed by colored rays from a neon (or equivalent) lamp 5 whenever the latter is momentarily energized by the impress thereon of a signal pulse, e. g., one indicative of the presence of an obstacle. The lamps 3 and 5 are fixedly mounted adjacent to one another well back of the mid-point of the scale 1 and adjacent to the center of a double-ended translucent pointer 7 which is rotated at a selected constant speed as by a motor 9. A reflector 11 which is fixedly mounted on a bracket 13 above the lamps 3 and 5 and a prism 15 which is mounted for rotation with the pointer picks up the rays from the said lamps. The pointer 7 is constituted of "Plexiglass," "Lucite" (methyl methacrylate resin), or other material having the optical properties of quartz. Hence, when the lamp 3 or the lamps 3 and 5 are actuated, the rays therefrom will be transmitted without substantial loss through the body of the pointer to its free ends 7a and 7b, which thus may be said to comprise the source or "virtual source" of whichever (i. e., "white" or "red") rays the spot or beam is comprised.

It will be observed that the scale-bearing surface 1 is mounted in a plane parallel to a plane which is tangent to the circle 7c circumscribed by the ends 7a and 7b of the rotating pointer 7. It is thus apparent that, irrespective of how close the ends of the pointer approach the center of the scale 1, the problem remains of transmitting light from the pointer to any point off the center of the scale. To make the scale or screen 1 of a length less than the diameter of the pointer 7 (as in U. S. Reissue Patent 17,784), would not solve this problem since such an expedient would compress or "crowd" the indicia, and hence reduce the resolution and accuracy of the scale.

The foregoing and other less apparent objections to the mechanical type indicators of the prior art are obviated, in accordance with the method of the present invention, by picking-up the rays which emanate from the pointer-ends 7a, 7b at a multiplicity of separate elementary areas, "stations" or "points" closely adjacent to the circular or other nonlinear path traversed by the pointer or "virtual source" 7 and then conducting said separately picked-up rays along a number of discrete "light lanes" to a corresponding number of elementary areas or "indicia points" on the linear scale-bearing surface or screen 1.

The medium or means for picking-up and conducting the rays from the pointer ends 7a, 7b to the screen 1 comprises a multiplicity of thin light-conducting strips 17 constituted of "Lucite" or the like, arranged in face to face relation with one end of each strip presented to the periphery of the path traversed by the pointer 7 and its other end presented to the rear surface of the translucent scale or screen 1. These strips 17 are maintained in face to face relation preferably without the use of any adhesive as by means of a suitable frame 19.

As shown in the drawing the "target" or scale 1 to which the light is conducted through the "lanes" 17 comprises an elongated plane surface. It will be apparent however that the said target may comprise a concave or other curved surface if desired since, the "Lucite" strips 17, or any of them, may be made of any desired length or curvature.

It might appear that the ends of these light conducting strips 17 could themselves comprise the target or screen upon which the light is viewed. The trouble with such an arrangement would be that since the light rays are confined to the particular lane upon which they are impressed the observer would have to be positioned in a direct line with that particular lane in order to see the signal. Since this is obviously an impractical procedure it is preferable to spread the light slightly by projecting it upon a piece of frosted glass, "plastic" 21 or the like, mounted closely adjacent or contiguous to the terminals or outer ends of the strips 17. While this transparent insert 21 may comprise the scale-bearing surface it is usually preferable to edge-light the scale as shown at 23, and, to this end, the scale-bearing surface per se comprises a separate transparent piece, 1.

It will now be apparent that the present invention provides a reliable and trouble-free method of and apparatus for transmitting light rays moving in a circular or other path of certain contour to a target of a different contour.

What is claimed is:

An indicator comprising a light-conductive double-ended pointer mounted for rotation about a central axis, a target comprising a continuous light-diffusing surface of a length corresponding substantially to one-half the circumference of the circular path described by said pointer mounted remote from said path and extending in a direction substantially normal to that of said axis, a source of light for said pointer mounted adjacent to said axis, means for picking up light rays transmitted from said source through said pointer at a multiplicity of discrete points contiguous one another along said circular path and for conducting said rays along discrete lanes to said light-diffusing target, and an illuminable scale bearing surface through which the diffused light on said target is adapted to be viewed.

ALBERT E. LANE.

REFERENCES CITED

The following references are of record in the file of this patent:

UNITED STATES PATENTS

| Number | Name | Date |
|---|---|---|
| 2,071,284 | Hyland | Feb. 16, 1937 |
| 2,124,089 | Stuerzel | July 19, 1938 |
| 2,286,014 | Rowe | June 9, 1942 |
| 2,286,737 | Hills | June 16, 1942 |
| 2,287,605 | Dickson et al. | June 23, 1942 |
| 2,333,492 | Ridge | Nov. 2, 1943 |
| 2,385,254 | Bludworth | Sept. 18, 1945 |

FOREIGN PATENTS

| Number | Country | Date |
|---|---|---|
| 304,692 | England | Nov. 7, 1929 |